INVENTOR.
Lewis H. Bishop
BY
Attorneys

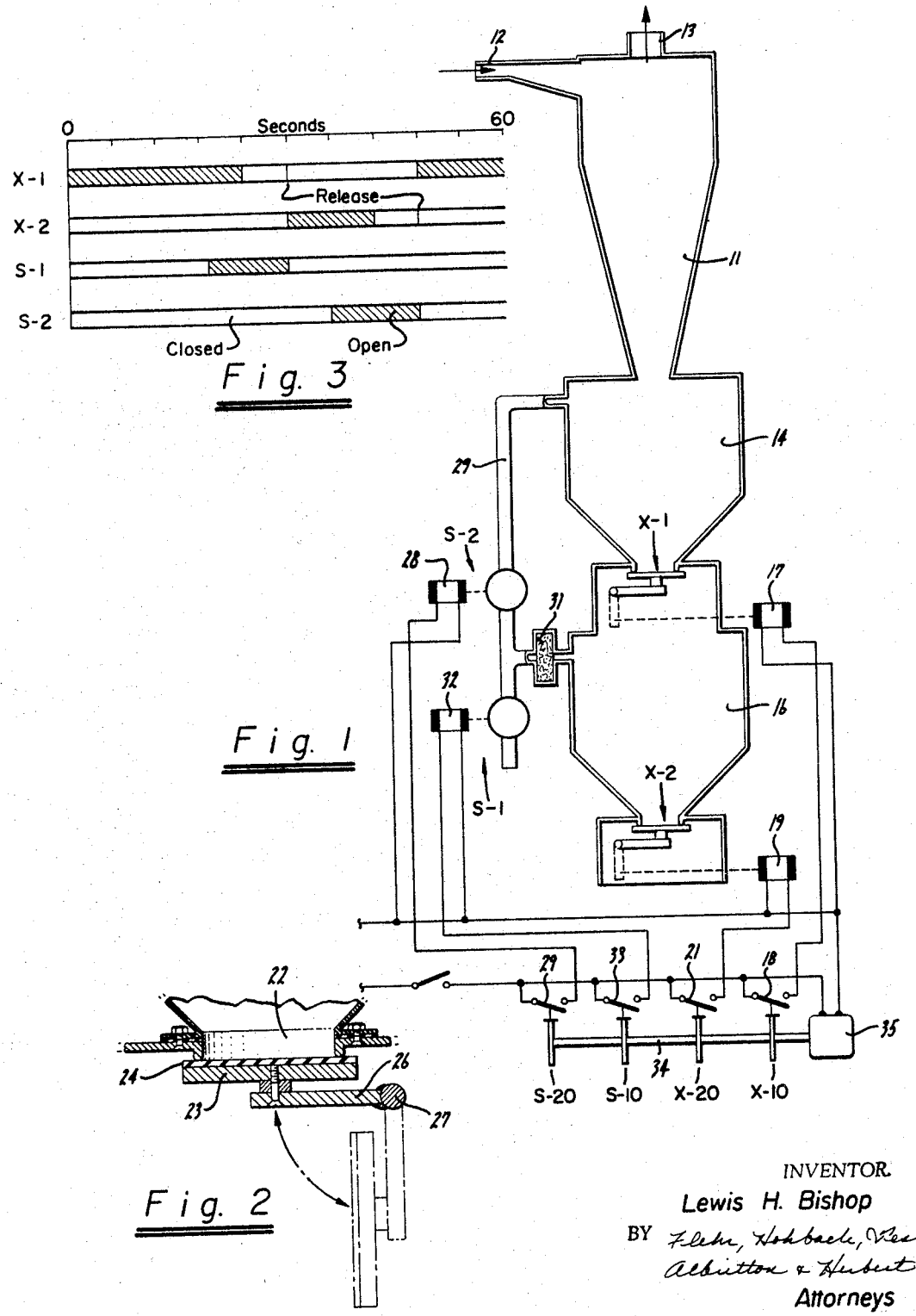

United States Patent Office 3,454,307
Patented July 8, 1969

3,454,307
AIR CONVEYER AND UNLOADER FOR GRANULAR MATERIALS AND UNLOADING PROCESS THEREFOR
Lewis H. Bishop, San Carlo, Calif., assignor to Pierce Specialized Equipment Co., San Carlos, Calif., a corporation of California
Filed Apr. 26, 1967, Ser. No. 633,957
Int. Cl. B65g *53/60*
U.S. Cl. 302—55                                    11 Claims

ABSTRACT OF THE DISCLOSURE

Apparatus and a method for unloading an air conveyer system. A cyclone separator formed by a first chamber operating at a vacuum is coupled to a second chamber through a transfer valve, the second chamber being unloaded through a second transfer valve into a convenient receptacle. The closing of both transfer valves and also the opening and closing of a balancing valve coupling the first and second chambers and an exhaust valve coupling the second chamber to the ambient atmosphere are timed. The transfer valves are opened by the effects of gravity or, alternatively, a spring bias and maintained closed by an air pressure differential across them. The balancing and exhaust valves are timed to provide such pressure differential and also to provide inrushing air through the valves to clear the valve sealing surfaces before closure. The transfer valve energization is discontinued to allow the valves to open if foreign matter prevents their full closure, and thus prevent both excessive wear of the valve and loss of air volume or velocity in the system.

Specification

The present invention is generally directed to an air conveyer and unloader for granular materials and unloading process therefor and more specifically to a process and apparatus where unloading does not affect the air conveying system.

Air conveying systems have been used in the past for removing or conveying granular materials from areas such as tanks, freight cars, ships at dry docks and similar storage compartments. The removing or conveying may be either for the purposes of reuse, relocation, or disposal of the material.

In the past much of the conveying has been done by hand or by bucket brigade fashion. This is especially true in the case of abrasive materials where the valving in air conveyer systems would be quickly incapacitated by passage of such abrasive materials. In addition, present air conveying systems capable of carrying abrasive materials disturb the air velocity in the system during the unloading process to seriously impair the overall efficiency of the system. For example, system stoppages may occur due to a packing of the material in associated air conduits.

It is therefore a general object of the invention to provide an improved air conveying and unloading apparatus and an improved method of unloading such air conveyer.

It is another object of the invention to provide an improved apparatus and method of the type described above where minimum disturbance to the air conveying system occurs during the unloading process.

It is another object of the invention to provide unloading system and apparatus in which the transfer valves have a relatively long life and in which provision is made for elimination of wear in the valve itself.

It is yet another object of the invention to provide an unloading system and apparatus in which the valving system is simple, economical and trouble free in operation.

In accordance with the above objects there is provided an air conveyer and unloader for granular materials having means for conveying such materials in an air stream having a predetermined velocity and means for separating such granular material from said moving air stream. The separating means includes a first storage chamber for storing the separated material which storage chamber is maintained at a pressure below ambient atmospheric pressure. The improvement in the unloader comprises a first transfer valve, means for closing the valve and a second storage chamber coupled to said first storage chamber by the transfer valve. A second transfer valve couples the second chamber to the ambient atmosphere. Means are also provided for closing this second valve. Pressure balancing means are coupled between the first and second chambers and to the atmosphere for providing reduced pressure in the second chamber prior to the opening of first transfer valve and for providing atmospheric pressure in said second chamber prior to the opening of the second transfer valve.

In addition, the present invention provides a method of unloading an air conveyer system which comprises the steps of closing the second transfer valve after unloading the second chamber, reducing the air pressure in the second chamber toward the existing vacuum in the first chamber, opening the first valve when the pressures are balanced allowing collected materials stored in the first chamber to fall into said second chamber, allowing a predetermined amount of ambient atmospheric air to enter the second chamber to tend to cause the pressure in the second chamber to be greater than that in the first chamber, closing the first transfer valve, allowing the air to continue to flow into the second chamber to build up the pressure differential between the first and second chambers to maintain closure of the first transfer valve, and opening the second valve when the pressure differential between the second chamber and atmospheric pressure has been reduced to zero whereby the second chamber is again unloaded.

Further objects of the invention will be apparent from the following description.

Referring to the drawings:

FIGURE 1 is a schematic view of the apparatus of the present invention.

FIGURE 2 is an enlarged detail view of one of the transfer valves of the present invention.

FIGURE 3 is a timing diagram showing the operating relationships of several essential components of the apparatus of the present invention.

Figure 5:
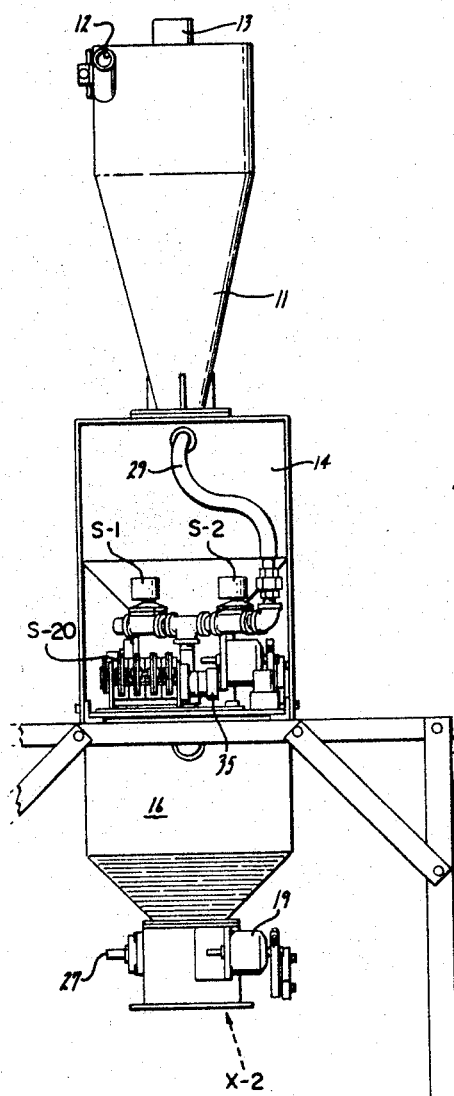
FIGURE 5 is a partial side elevational view of FIGURE 4.

Referring first to FIGURE 1, the air conveying portion of the apparatus includes a separating cyclone tank 11 having an inlet 12 and an outlet 13. A vacuum is continuously drawn on outlet 13 to maintain a relative vacuum in cyclone 11. By the usual principles of cyclone separation a greatly reduced velocity occurs within the cyclone tank 11 so that the heavier particles of material fall into the cyclone cone and thence into a first storage chamber 14. It is apparent that to maintain a constant air velocity from inlet 12 to outlet 13 that the vacuum chambers 11 and 14 must not be seriously disturbed by the unloading process of the separated material.

A first transfer valve X–1 couples first chamber 14 to a second chamber 16. Means for closing the transfer valve X–1 includes a solenoid 17 which is actuated by a switch 18.

Chamber 16 is coupled to the ambient atmosphere and any convenient receptacle into which the material may be unloaded by a second transfer valve X–2 which is similar in construction to transfer valve X–1. This valve is operated by a solenoid 19 which is in turn energized by a switch 21. The similarity of valves X–1 and X–2 is not necesary, however, for effective use of the present invention.

FIGURE 2 illustrates a detail of the transfer valve arrangement which includes an outlet orifice 22, a closure member 23 which has appropriate resilient valve sealing material 24 thereon, and a retainer arm 26 which is pivoted on a rod 27. This rod is coupled to the actuating solenoids 17 and 19. Either transfer valve will fall to an open position as illustrated in phantom in the absence of an external closing force which may be provided either by solenoids 17 and 19 or the existence of a pressure differential across the closed valve.

Pressure balancing means are coupled between chambers 14 and 16 and to the atmosphere for providing a reduced pressure or vacuum in chamber 14 prior to opening valve X–1 and also for providing atmospheric pressure in chamber 16 prior to opening transfer valve X–2.

More specifically, the balancing means includes a balancing valve S–2 coupled by air conduit or piping 29 of a predetermined diameter between chamber 14 and chamber 16 through a series connected filter 31. Filter 31 is so connected that it filters any air passing from chamber 16 into chamber 14 thus protecting valve S–2 against the passage of any dust particles from chamber 16 through conduit 29. The balancing valve S–2 is controlled by a solenoid 28 which in turn is energized by a switch 29. A second exhaust valve S–1 is coupled to the ambient atmosphere through conduit 29 to the outlet of filter 31 to bring chamber 16 to atmospheric air pressure. The valve S–1 is operated by a solenoid 32 which is actuated by a switch 33. The switches 18, 21, 33 and 39 associated with the transfer valves and balancing and exhaust valves are operated in a timed relationship by their associated cams X–10, X–20, S–10, S–20, which cams are associated with similar valves. The cams are mounted on a common shaft 34 which is driven by a motor 35 at a predetermined speed. Such motor and cam arrangement may be purchased as a unit and adjusted for any predetermined timing arrangement.

The specific timing arrangement of the present invention is illustrated in FIGURE 3 where in the specific embodiment of the present invention the time axis is from 0 to 60 seconds and shows the open and closed condition of valves X–1, X–2 and S–1, S–2, the open condition being cross-hatched in the timing diagram and the closed condition clear. It should be understood that depending on the specific application the time scale of this timing diagram would be modified to suit the overall conveyor system and the amount of material which is to be removed from the system.

Figure 4:
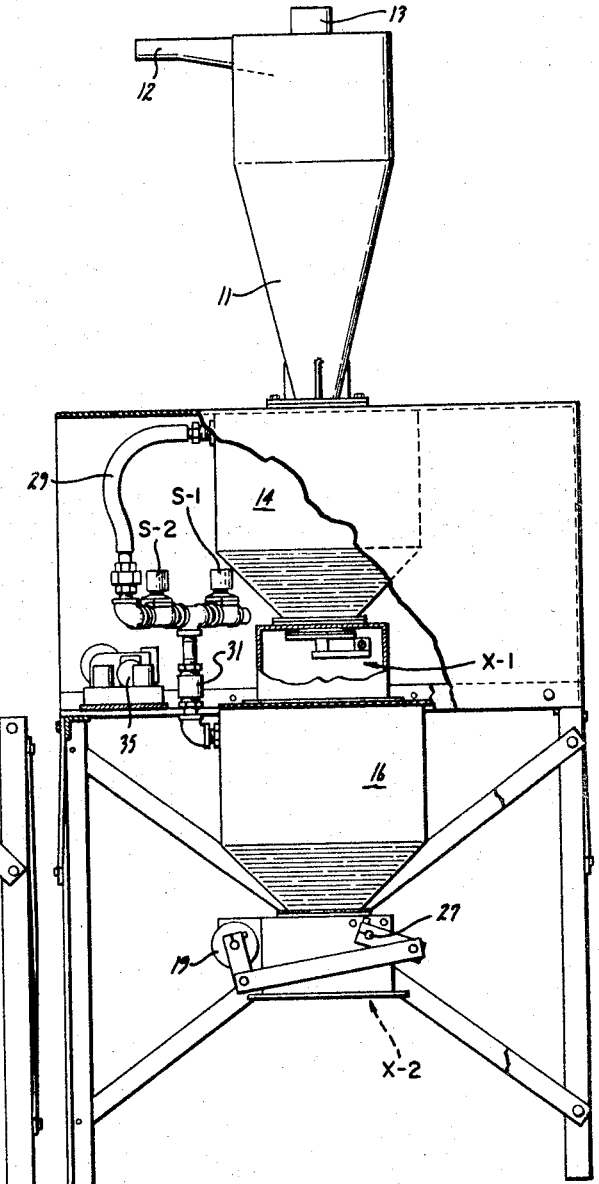
FIGURE 4 is an elevational view of apparatus embodying the invention, partially cut away.

FIGURES 4 and 5 show elevational views of an actual air conveyor and unloader as mounted on a steel support structure 37 with the similarly numbered components corresponding to those of FIGURE 1.

*Operation*

The operation of the present invention is best illustrated in connection with FIGURES 1 and 3. However, in FIGURE 1 it should be understood that the cams on cam rod 34 are not illustrated in their true relationship but that these relationships are shown in FIGURE 3.

The operation of the system will be described assuming that as a starting point the transfer valve X–2 is open and that chamber 16 has just been unloaded. At this time, the air conveying system is, of course, operating under its full vacuum condition with valve X–1 being closed and chamber 14 collecting separated materials. Referring to the timing diagram of FIGURE 3, transfer valve X–2 should be located in the cross-hatched open portion of the timing curve. Before the attempted closure of X–2 by energization of solenoid 19 in preparation for receiving additional material into chamber 16 from chamber 14, balancing valve S–2 is opened as shown. This allows air to flow out of chamber 16 through balancing valve S–2 into chamber 14 to tend to drop the existing pressure in the chamber 16 to the existing vacuum in chamber 14. However, since valve X–2 is open allowing a large inrush of air, this does not yet occur and chamber 16 is at atmospheric pressure. Shortly thereafter valve X–2 is closed by solenoid 19 as indicated on the timing diagram and if the closure is successful, and there are no foreign particles interfering with the seating of the valve, chamber 16 will reach the same vacuum condition as chamber 14. Since the pressure was being reduced in chamber 16 as valve X–2 was in the process of being closed, the inrushing air into chamber 16 tends to clear the valve seating. However, if it is not cleared successfully and some foreign matter remains wedging the valve open, then at a predetermined point in the cycle marked "release" on the X–2 timing diagram valve S–2 will close to maintain chamber 16 at atmospheric pressure and the solenoid 19 will at the same time be de-energized and X–2 will open by the effect of gravity. In other words, if foreign material is caught in the valve, the cycle will be aborted at this point and an attempt to achieve a proper unloading procedure will not be initiated until the next cycle.

Assuming, however, that the X–2 valve is properly closed, the release point of the X–2 valve by solenoid 19 will not cause the valve to open since by this time a differential pressure will have built up between atmosphere and chamber 16 to maintain the closure of the valve. When the pressure or vacuum is equal in chambers 14 and 16, which occurs sometime before the release point in the X–2 cycle, valve X–1 will open due to the effects of gravity unloading any collected material into a chamber 16.

Alternatively, transfer valves X–1 and X–2 may be spring loaded to add to the effect of gravity and achieve a more positive mode of operation.

After allowing such material to fall into the second chamber valve S–1 is opened, as shown in the timing diagram, allowing atmospheric air to enter chamber 16. This flushes filter 31. However, because of the diameter of the conduit 29 sufficient air is not introduced into the system to affect the efficiency of the air conveyor. As shown in the timing diagram, shortly after valve S–1 is opened the closure of valve X–1 is initiated in a manner similar to the previous closure of X–2; that is, valve S–1 has allowed inrushing air into chamber 14 to clear the valve seating surfaces and if valve X–1 closes properly, the air pressure differential between chambers 14 and 16 will maintain the closure of the valve after de-energization of its solenoid 17. And also in the same manner as X–2 there is a release point in the timing cycle of valve X–1 so that if foreign matter wedges it open then this portion of the cycle will abort to allow valve X–1 to fall open at the release point when exhaust valve S–1 is closed in the same manner as in the above mentioned case until the next unloading cycle.

However, assuming that X–1 closes properly, the exhaust valve S–1 will have admitted sufficient air into chamber 16 to equalize the pressure between chamber 16 and the ambient atmosphere and valve X–2 will fall open due to the effects of gravity to unload chamber 16 whereupon the complete cycle has now been executed.

It will be obvious that conduit 29 in addition to being small enough to avoid disturbance of the air conveying system is of a large enough diameter to balance the air pressures between the two chambers in a rapid enough time to allow for a reasonable unloading intervals of the system.

In summary, the present invention thus provides an apparatus and method for unloading an air conveying system in which the valving and chambers are provided for causing minimum disturbance to the pressures in the air conveying system, and in which the valves for the transfer of the granular material are automatically cleaned to prevent undue wear by the abrasive effects of the granular material being collected thereby greatly extending the life of the valves.

I claim:

1. An air conveyer and unloader for granular materials having means for conveying such materials in an air stream having a predetermined velocity and means for separating such granular material from said moving air stream, such separating means including a first storage chamber for storing the separated material which storage chamber is maintained at a pressure below ambient atmospheric pressure, the improvement in said unloader comprising a first transfer valve, means for closing said first transfer valve, a second storage chamber coupled to said first storage chamber by said transfer valve, a second transfer valve coupling said second chamber to the ambient atmosphere, means for closing said second valve, pressure balancing means coupled to said first and second chambers and to the atmosphere for providing said reduced pressure in said second chamber prior to the opening of said first transfer valve and for providing said atmospheric pressure in said second chamber prior to the opening of said second transfer valve, said pressure balancing means including a balancing valve for coupling said second chamber to said below atmospheric pressure, and means including an exhaust valve coupling said second chamber to said ambient atmosphere, timing means for controlling said closing means of said transfer valves and the opening and closing of said balancing and exhaust valves, and means for opening said transfer valves independent of said closing means.

2. An air conveyer and unloader as in claim 1 in which said timing means initiates the opening of said exhaust valve before the attempted closure of said first transfer valve whereby air is allowed to pass through said open first transfer valve into said first said chamber from the atmosphere clearing sealing surfaces around the valve before its closure.

3. An air conveyer and unloader as in claim 1 in which said timing means initiates the opening of said balancing valve before the attempted closure of said second transfer valve whereby air is allowed to pass through said open second transfer valve into said second chamber and through said balancing valve into said first chamber clearing sealing surfaces around said second valve before its closure.

4. An air conveyer and unloader as in claim 1 where said first transfer valve falls open due to gravity forces in the absence of actuation of said closing means and in the absence of a pressure differential across the valve, said timing means disabling the means for closing said first transfer valve during a time period when said exhaust valve is closed and said second transfer valve is closed whereby if a foreign object is lodged in said first valve, a pressure differential will not develop across said valve and gravity will reopen it.

5. An air conveyer and unloader as in claim 4 in which said timing means disables said means for closing said first transfer valve at substantially the same time said exhaust valve is closed.

6. An air conveyer and unloader as in claim 1 where said second transfer valve falls open due to gravity forces in the absence of actuation of said closing means and in the absence of a pressure differential across the valve, and said timing means disables the means for closing said second valve during a time period when said balancing valve is closed and said first transfer valve is closed whereby if a foreign object is lodged in said second valve a pressure differential will not develop across said valve and gravity will reopen it.

7. An air conveyer and unloader as in claim 6 in which said timing means disables said means for closing said second transfer valve at substantially the same time said balancing valve is closed.

8. An air conveyor and unloader as in claim 1 in which said balancing valve and said exhaust valve in addition to having one of their ports coupled to said first chamber and the ambient atmosphere, respectively, have the other of their ports joined to a series connected filter coupled to an outlet port of said second chamber, said filter being arranged to provide filtering action when air is passing from said second chamber to said first chamber through said balancing valve and to provide for a flushing action of the filter when air is passing from the ambient atmosphere through said exhaust valve into said second chamber.

9. An air conveyor and unloader as in claim 1 in which said means for opening said transfer valves is the effect of gravity on the valves themselves.

10. An air conveyor and unloader as in claim 1 in which said means for closing said first transfer valve is mechanically independent from said opening and closing of exhaust valve.

11. In an unloader for use in apparatus for conveying granulated materials in an air stream, means for separating the granulated material from the air stream, means forming a first storage chamber for receiving the granulated material from the means for separating, said first storage chamber having a discharge opening therein, a second storage chamber having an inlet opening in communication with the discharge opening of said first storage chamber, said second storage chamber being disposed below said first storage chamber so that granulated material from the first storage chamber can flow by gravity into the second storage chamber, said second storage chamber having a discharge opening therein, first valve means for closing the discharge opening in said first storage chamber, second valve means for closing the discharge opening in said second storage chamber, said first and second valve means being movable between closed and open positions with respect to their discharge openings, first and second means operable independently of each other for moving said first and second valve means to their closed positions, said first and second valve means being movable to open positions as soon as said first and second means for moving said first and second valves are not operated, vacuum producing means, means connecting the vacuum producing means to the first storage chamber, piping means connecting the vacuum producing means to the second storage chamber, balance valve means mounted in said piping, additional piping means connecting said second storage chamber to the atmosphere, exhaust valve means mounted in said additional piping means, motor operated timing means for causing a cyclical operation of said first and second means for moving said first and second valves and said balance valve and said exhaust valve whereby said second moving means is operated to close said second valve means and said exhaust valve means and said balance valve means are operated to apply a vacuum to said second storage chamber to establish a differential pressure between the second storage chamber and the atmosphere whereby said second valve means is retained in a closed position by said differential pressure, said first valve means moving automatically to an open position when the pressures in said first and second storage chambers are substantially balanced to permit the granulated material in the first storage chamber to flow by gravity into the second storage chamber, said first valve means after a predetermined period of time sufficient to permit the granulated material to flow from the first to the second storage chamber, being moved to a closed position by operation of said means for moving said first valve means, said balancing valve means and said exhaust valve means being thereafter operated to bleed atmospheric air into the second storage chamber to permit the pressure in the second storage chamber to come into balance with the atmospheric air and to thereby permit said second valve means to open automatically independently of the first valve means to discharge the granulated material in the second storage chamber through the discharge opening in this second storage chamber and thereafter said same sequence of operation is repeated.

References Cited

UNITED STATES PATENTS

| | | | |
|---|---|---|---|
| 2,035,410 | 3/1936 | Smith | 302—59 |
| 2,744,792 | 5/1956 | Finn | 302—59 X |
| 3,115,369 | 12/1963 | Bozich | 302—59 X |
| 3,169,038 | 2/1965 | Pendleton | 302—59 |

ANDRES H. NIELSEN, *Primary Examiner.*

U.S. Cl. X.R.

302—59